United States Patent
Jansen

(10) Patent No.: US 7,147,410 B2
(45) Date of Patent: Dec. 12, 2006

(54) TOOL HEAD FOR HOLDING A TOOL IN A MACHINE TOOL

(75) Inventor: Karlheinz Jansen, Schutterwald (DE)

(73) Assignee: WTO Werkzeug-Einrichtungen GmbH, Ohlsbach (DE)

(*) Notice: Subject to any disclaimer, the term of this patent is extended or adjusted under 35 U.S.C. 154(b) by 209 days.

(21) Appl. No.: 10/248,664

(22) Filed: Feb. 6, 2003

(65) Prior Publication Data
US 2003/0152431 A1 Aug. 14, 2003

(30) Foreign Application Priority Data
Feb. 8, 2002 (DE) ................. 102 05 234

(51) Int. Cl.
*B23B 51/06* (2006.01)
(52) U.S. Cl. .......................... 408/56; 279/20
(58) Field of Classification Search .............. 408/56, 408/57, 59; 279/20; 409/135, 136
See application file for complete search history.

(56) References Cited

U.S. PATENT DOCUMENTS

| | | | | |
|---|---|---|---|---|
| 3,024,030 A | * | 3/1962 | Koch | 279/20 |
| 4,708,538 A | | 11/1987 | Kubo et al. | 408/59 |
| 4,795,292 A | * | 1/1989 | Dye | 409/136 |
| 4,951,578 A | * | 8/1990 | von Haas et al. | 409/136 |
| 5,311,654 A | * | 5/1994 | Cook | 29/447 |
| 5,613,812 A | * | 3/1997 | Levan et al. | 409/136 |
| 5,676,506 A | * | 10/1997 | Sugata | 409/136 |
| 5,758,995 A | * | 6/1998 | Sahm | 408/57 |
| 5,890,849 A | * | 4/1999 | Cselle | 408/1 R |
| 6,060,694 A | * | 5/2000 | Hauser | 219/221 |
| 6,729,813 B1 | * | 5/2004 | Sahm et al. | 409/136 |
| 6,808,342 B1 | * | 10/2004 | Kress et al. | 409/136 |
| 2002/0034427 A1 | * | 3/2002 | Senzaki | 409/136 |

FOREIGN PATENT DOCUMENTS

| | | | | |
|---|---|---|---|---|
| CH | 628268 A | * | 2/1982 |
| DE | 2400461 A | * | 7/1974 |
| DE | 3024585 A | * | 1/1982 |
| DE | 3128893 A | * | 2/1983 |
| DE | 3702216 A | * | 10/1987 |
| DE | 3801508 A | * | 7/1989 |
| DE | 10015322 A1 | * | 10/2001 |
| EP | 369154 A | * | 5/1990 |
| EP | 434023 A2 | * | 6/1991 |
| EP | 464335 A2 | * | 1/1992 |
| JP | 56003162 A | * | 1/1981 |
| JP | 05337713 A | * | 12/1993 |
| JP | 06047647 A | * | 2/1994 |
| JP | 06206140 A | * | 7/1994 |
| JP | 08126936 A | * | 5/1996 |
| JP | 2001150213 A | * | 6/2001 |

* cited by examiner

*Primary Examiner*—Monica Carter
*Assistant Examiner*—J Williams
(74) *Attorney, Agent, or Firm*—Gudrun E. Huckett

(57) ABSTRACT

A tool head for securing a tool in a machine tool has a stationary spindle bearing housing, a spindle rotatably supported in the spindle bearing housing, and a modular tool changing insert for receiving a tool. The tool changing insert is exchangeably arranged on the spindle or a holder. An internal cooling medium supply device supplies a cooling medium directly from the spindle bearing housing into the tool changing insert. The cooling medium supply device preferably supplies the cooling medium laterally into the tool changing insert via an auxiliary housing.

7 Claims, 4 Drawing Sheets

TOOL HEAD FOR HOLDING A TOOL IN A MACHINE TOOL

BACKGROUND OF INVENTION

1. Field of the Invention

The invention relates to a tool head for securing a tool in a machine tool. The tool head comprises a stationary spindle bearing housing, a spindle rotatably supported in the spindle bearing housing, a modular tool changing insert configured to receive the tool and exchangeably arranged on the spindle or a holder of the spindle.

2. Description of the Related Art

The economic use of cutting tools on machine tools requires the supply of cooling medium (coolant) to the cutting edge in order to cool and lubricate the cutting edge and to remove the cuttings that are produced. This is realized by means of diverse cooling medium supply devices such as sealing lip systems, gap seals as well as axial face seals. All of these known configurations have in common that the supply of the cooling medium takes place directly in the rotating spindle of the machine tool or in the driven tool or is realized by means of an auxiliary device. The supply of the cooling medium is carried out either in front of, behind or between the bearing of the spindle relative to the housing. The very complex process of machining by cutting, depending on the application, requires different pressure stages for an optimal supply of the cooling medium to the cutting edge of the tool. In the case of deep drilling operations, the required cooling medium pressure can even be between 20 and several 100 bar.

In order to achieve an additional productivity increase, the use of modular tool systems of the aforementioned kind has been promoted in recent years. The principal idea in this connection is that the tool is not received directly at the forward end of the spindle or of a holder on the spindle but that a tool changing insert is exchangeably arranged as a module on the spindle or the holder. This tool changing insert then actually receives the tool.

These modular systems have the advantage that the cutting tools can be preadjusted and introduced into the tool changing insert externally to the machine tool. As a result of the configuration of such modular tool changing systems, the changing of the tool changing insert into the spindle or the holder is carried out such that the tool change generally is carried out significantly faster and, more importantly, with already pre-adjusted cutting tools.

The tool changing systems however have disadvantages in some respects, as a result of their clamping systems, in regard to the entire tool length. These disadvantages in regard to the tool length have an effect primarily in the case of machines with restricted available space. When combining, for example, in the case of driven tools, the tool with the afore described modular tool changing receptacle, i.e., the tool changing insert, and an internal cooling medium supply device, very significant length problems can result which can only be resolved by measures in regard to the configuration of the machine tool. In the case of an internal cooling medium supply, the supply of the cooling medium begins at the spindle bearing housing and continues via the spindle into the tool changing insert and from there to the tool. The cooling medium supply in these known modular systems employing an additional tool changing insert, is such that the disadvantage of these modular tool systems with respect to the configurational length is even more pronounced by installing the inner cooling medium supply device.

A further disadvantage of the known inner cooling medium supply device, arranged between, before or behind the bearing, is that in the case of defects or system—caused leakage cooling medium can penetrate into the driven tool. Finally, with the known internal cooling medium supply device it is not possible to use optimal sealing strategies because they cannot be integrated within the tool head for configurational reasons or functional considerations.

SUMMARY OF INVENTION

It is an object of the present invention to provide an improved inner cooling medium supply device for a tool head with a modular tool changing insert of the aforementioned kind for securing a tool in a machine tool.

In accordance with the present invention, this is achieved in that the cooling medium supply is realized from the spindle bearing housing or an auxiliary housing arranged fixedly thereat directly into the tool changing insert.

The tool head according to the invention based on a driven tool with a modular separating location provides improved inner cooling medium supply. The cooling medium supply according to the invention does not aggravate the already present disadvantage of the modular tool systems with respect to configurational length as a result of the installation of this internal cooling medium supply. This is so because the configurational length of the already required tool changing insert is used expediently for the cooling medium supply device as well as for the sealing system. A further advantage of the internal cooling medium supply device according to the invention resides in that cooling medium cannot penetrate into the driven tool in the case of a defect or system—caused leakage. Finally, it is now possible to use optimized sealing strategies which in the past could not be integrated into the device for space reasons or functional reasons.

The tool changing insert has on one end a receptacle that is specific to the tool changing system for arrangement on the spindle or the holder and on the other end a suitable receptacle for receiving the tool. The total length of these inserts is determined for the shortest configuration generally based on the required length for the clamping system of the modular separating location and the required length for the receptacle for the tool. The cooling medium which is supplied to the tool changing insert is guided in the interior of the tool changing insert through bores and channels from the peripheral surface to the tool receptacle. The diameter of the tool changing insert is determined for the smallest size by the interface of the modular tool changing system and, moreover, primarily by the configuration of the cooling medium transfer device. Shoulders, depending on the configurational embodiments, are permissible as long as an unimpeded exchange of the tool changing insert corresponding to the changing system remains possible. In regard to the cooling medium supply being directly guided from the spindle bearing housing into the tool changing insert, this is to be understood also to include embodiments according to which the spindle bearing housing is provided with an auxiliary housing; this will be explained in more detail in the following.

One particular embodiment resides in that the configurational length determined by the modular changing system and determined primarily by bores and contours within the interior of the tool changing insert, is used in the external area for the supply of the cooling medium and its sealing arrangement. In this way, the advantages of the modular separating location remain intact and the actual disadvantage of the tool changing system, i.e., the greater configurational length, is used for supplying the cooling medium. Because of the arrangement of the cooling medium supply device completely outside of the driven tool, cooling medium cannot penetrate into the driven tool because possibly occurring leakage can be removed.

It is basically conceivable that the cooling medium transfer is realized directly from the actual spindle bearing housing to the tool changing insert inasmuch as the spindle bearing housing reaches correspondingly far forwardly into the peripheral area of the tool changing insert. The cooling medium supply is thus a complete component of the housing of the driven tool.

A preferred embodiment of this arrangement suggests that the actual spindle bearing housing is provided with an auxiliary housing in order to enable in this way a modular retrofitting, as needed. The driven tool with a modular separating location is always the basis for this configuration. An auxiliary housing with a cylindrical bore is positioned onto this tool. The tool changing unit is inserted into this bore and can be changed in accordance with the configuration of the modular tool system, so that the advantages of the system are not affected. The cooling medium is transferred from the auxiliary housing via bores and/or annular or otherwise configured channels into the tool changing insert. The auxiliary housing is connected by a suitable constructive configuration to the housing of the driven tool. In this connection, it is to be taken into consideration that the axis of the bore is to be aligned with the axis of the spindle of the driven tool. Depending on the configuration of the cooling medium supply device with respect to the machine tool, the supply of the cooling medium is realized by a hose, a pipe or the like directly into the housing or is transferred via the housing of the driven tool and bores or channels. The separate configuration with the auxiliary housing has the advantage that the driven tool, without requiring any changes, can be used for tools with purely external cooling medium supply and, as described above, with internal cooling medium supply. The auxiliary housing is advantageously configured in the area of the interface to the housing of the driven tool such that the cooling medium, which exits from the cooling medium transfer location as leakage, can flow out unimpededly. The auxiliary housing supports also the sealing system or a part of the sealing system.

The receiving bore in the auxiliary housing can be a direct component of the auxiliary housing or, according to another embodiment, can be in the form of an additional bushing. If worn, this bushing can therefore be exchanged. It is comprised preferably of bronze or brass.

In a preferred embodiment, the seal is in the form of a gap seal for transferring the cooling medium.

As an alternative, a contacting shaft seal with a sealing lip system can be provided. In this case, the cooling medium is thus supplied between two lip seals between the housing part and the tool changing insert. In this configuration, the sealing lips contact directly the tool changing insert. With this sealing variant, it is also possible to supply compressed air (for aircutting) to the tool changing insert without causing a high leakage rate across the sealing gap. In the case of a change of the tool changing insert, however, great care is required in order not to damage the sealing lips.

This can be circumvented in that, according to another embodiment, an additional intermediate sleeve is provided. In this case, the sealing lip of the shaft seal directly contacts the intermediate sleeve. The intermediate sleeve is sealed by static seals, such as O-rings, relative to the tool changing insert. The intermediate sleeve remains in the housing area during change of the tool changing insert; the tool changing insert is removed or pulled out of the intermediate sleeve. In this way, the sensitive sealing lip is protected. The rotational movement takes place between the intermediate sleeve and the sealing lip, wherein the intermediate sleeve rotates together with the tool changing insert and the spindle.

According to another embodiment, an alternative sealing action is provided by an axial face seal. In particular in the case of high pressures, it may be required to replace the described lip seal by such an axial face seal. In this case, rotation also takes place between the intermediate sleeve and the sealing arrangement. A static seal is provided between the intermediate sleeve and the tool changing insert.

According to yet another embodiment of the invention, in the case of a configuration where the tool changing insert and the auxiliary housing are a unit, the auxiliary housing arranged at the tool changing insert must be changed also when changing the tool changing insert. In this way, the tool changing insert and the auxiliary housing can be adjusted optimally to one another.

DETAILED DESCRIPTION

Figure 1:
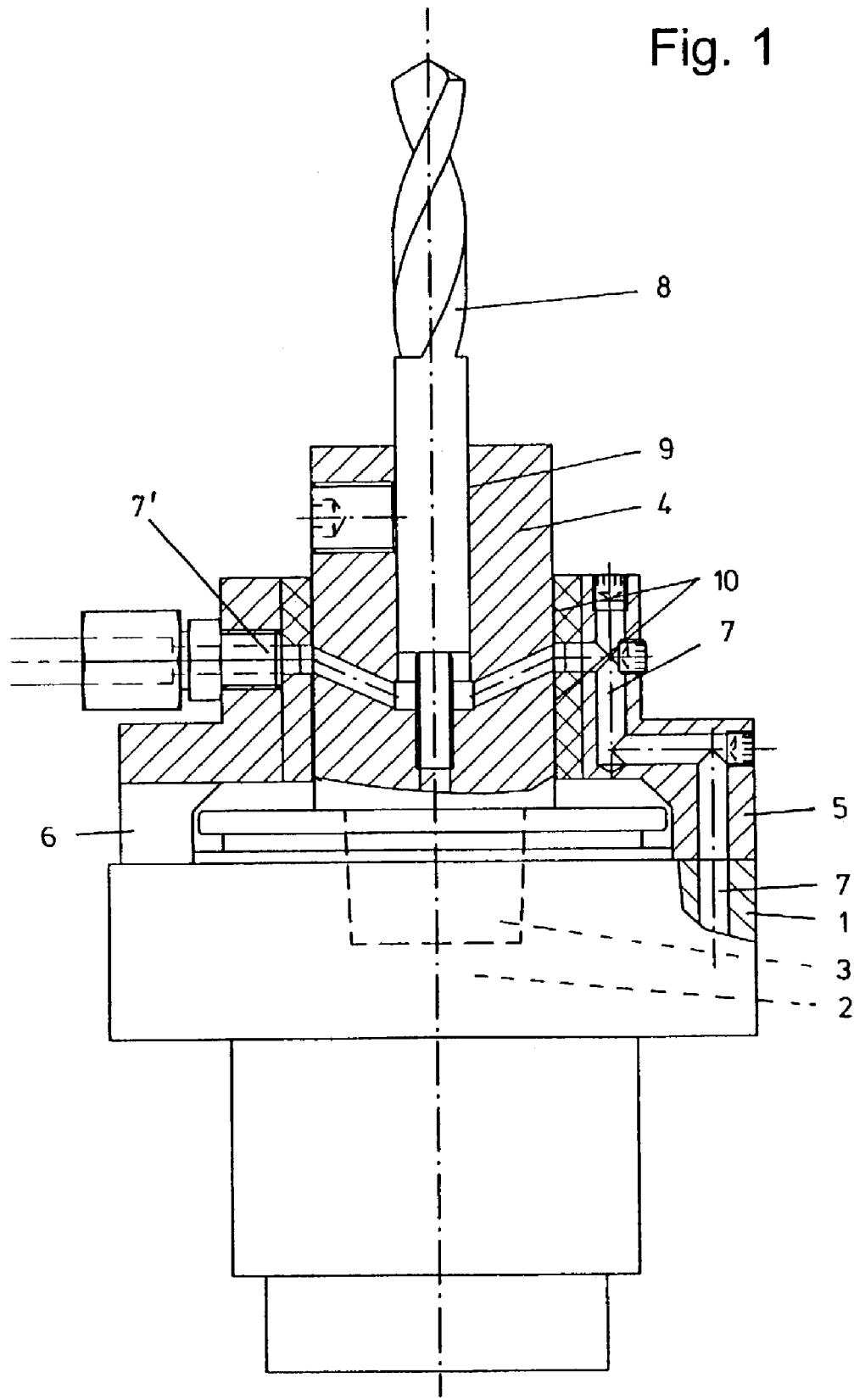
FIG. 1 is a longitudinal section of a first embodiment of a tool head with a gap seal.

The tool head with a driven tool has a spindle bearing housing 1 in which a spindle 2 is rotatably supported. The forward end of this spindle 2 has a receptacle 3 for an adaptable, modular tool changing insert 4 that is exchangeable. An auxiliary housing 5 encloses the tool changing insert 4 and is fixedly arranged on the end face of the spindle bearing housing 1. A leakage drain 6 is arranged in the area of the separating location between the spindle bearing housing 1 and the auxiliary housing 5.

The described tool head has a cooling medium supply device 7 comprised of bores and/or channels. It begins in the spindle bearing housing 1, continues within the auxiliary housing 5, and finally opens with a supply opening in the area of the peripheral surface of the tool changing insert 4. From here, the cooling medium is guided into the interior of the tool changing insert 4 from where it is supplied to the tool 8 which is secured in a tool receptacle 9 within the tool changing insert 4.

An alternative cooling medium supply device 7' extends directly from the auxiliary housing 5.

A gap seal 10 is provided as a seal between the auxiliary housing 5 and the tool changing insert 4.

Figure 2:
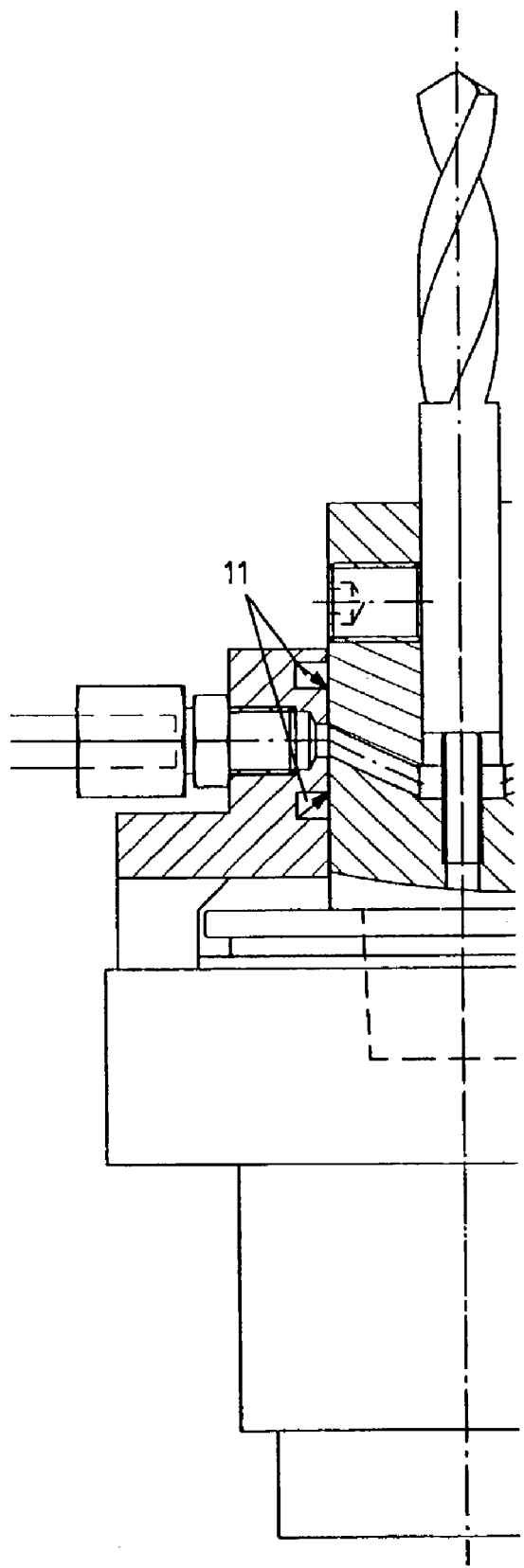
FIG. 2 is a second embodiment with a shaft seal.

The second embodiment of the tool head according to the present invention illustrated in FIG. 2 differs from the first embodiment of FIG. 1 by the configuration of the seal. Instead of the gap seal 10, this second embodiment is provided with a contacting shaft seal 11.

Figure 3:
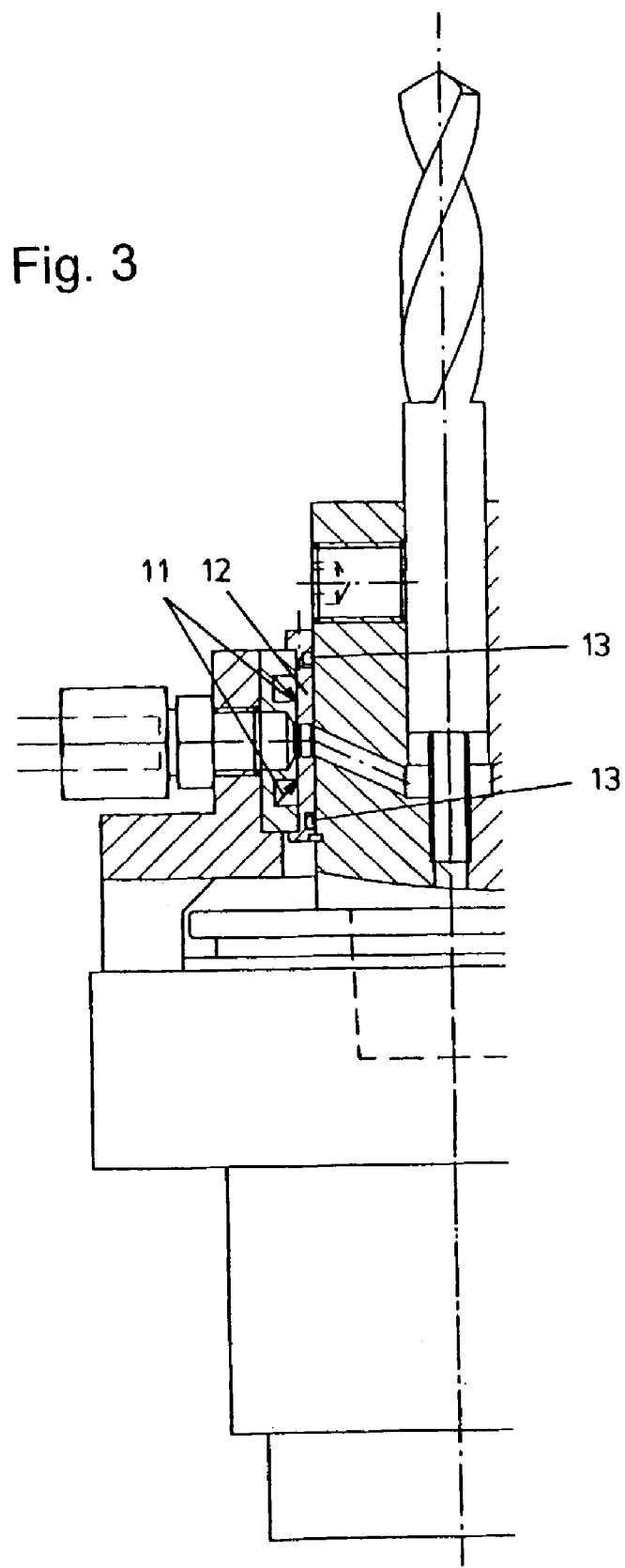
FIG. 3 shows a third embodiment, also provided with a shaft seal, but additionally provided with an intermediate sleeve.

In order to prevent damage of the shaft seal 11 upon withdrawal of the tool changing insert 4, the third embodiment of FIG. 3 provides a further development of the second embodiment of FIG. 2 in that an auxiliary intermediate sleeve 12 is connected fixedly to the tool changing insert 4 for common rotation therewith. The seal between the intermediate sleeve 12 and the tool changing insert 4 is realized by a static seal 13 in the form of O-rings.

Figure 4:
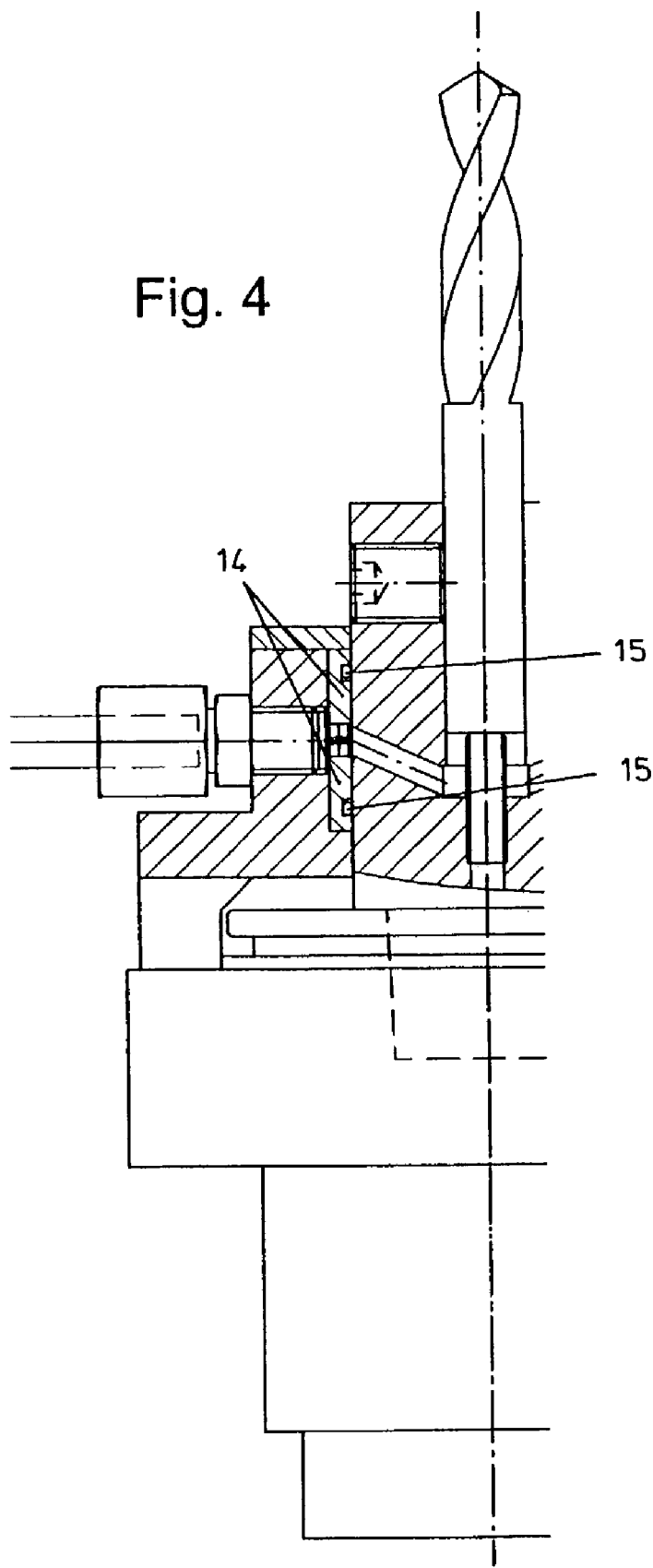
FIG. 4 shows a fourth embodiment with an axial face seal.

The fourth embodiment according to FIG. 4 has a seal in the form of an axial face seal 14 that is axially slidable. It also comprises a static seal 15 between it and the tool changing insert 4.

While specific embodiments of the invention have been shown and described in detail to illustrate the inventive principles, it will be understood that the invention may be embodied otherwise without departing from such principles.

What is claimed is:

1. A tool head for securing a tool in a machine tool, the tool head comprising:
   a stationary spindle bearing housing;
   a spindle rotatably supported in the spindle bearing housing;
   an auxiliary housing fixedly connected to an end face of the spindle bearing housing;
   a separate modular tool changing insert for receiving a tool, wherein the tool changing insert is arranged on the spindle or the holder and is rotatably supported in the auxiliary housing;
   wherein the tool changing insert is separately exchangeable relative to the spindle or the holder without having to exchange the auxiliary housing;
   wherein a tool is introduced into and preadjusted within the tool changing insert externally to the machine tool;
   an internal cooling medium supply device opening from the auxiliary housing immediately into the tool changing insert in a radial direction and opening directly laterally into the tool changing insert.

2. The tool head according to claim 1, wherein the auxiliary housing has an exchangeable bushing defining a central receiving bore for the tool changing insert.

3. The tool head according to claim 1, further comprising a gap seal arranged between the spindle bearing housing or the auxiliary housing and the tool changing insert.

4. The tool head according to claim 1, further comprising a shaft seal arranged between the spindle bearing housing or the auxiliary housing and the tool changing insert.

5. The tool head according to claim 4, further comprising an intermediate sleeve arranged between the shaft seal and the tool changing insert and fixedly connected for common rotation to the tool changing insert.

6. The tool head according to claim 1, further comprising an axial face seal axially slidably arranged between the spindle bearing housing or the auxiliary housing and the tool changing Insert on both sides of a supply opening of the cooling medium suppiy device and fixedly connected for common rotation to the tool changing insert.

7. The tool head accordIng to claim 1, wherein the cooling medium supply device is configured to supply the cooling medium to the tool changing insert from the spindle bearing housing through the auxiliary housing or directly to the tool changing insert from the auxiliary housing.

* * * * *